US009384510B2

(12) United States Patent
Battcher et al.

(10) Patent No.: US 9,384,510 B2
(45) Date of Patent: Jul. 5, 2016

(54) SYSTEMS AND METHODS FOR PROVIDING A ROOF GUIDE

(71) Applicant: Donan Engineering Co., Inc., Louisville, KY (US)

(72) Inventors: Duane Michael Battcher, Prospect, KY (US); David Brent Riggs, Louisville, KY (US); Leslie Ammerman Noel, Louisville, KY (US); James Lyle Donan, Anchorage, KY (US)

(73) Assignee: Donan Engineering Co., Inc., Louisville, KY (US)

( * ) Notice: Subject to any disclaimer, the term of this patent is extended or adjusted under 35 U.S.C. 154(b) by 0 days.

(21) Appl. No.: 14/245,697

(22) Filed: Apr. 4, 2014

(65) Prior Publication Data
US 2015/0093047 A1    Apr. 2, 2015

Related U.S. Application Data

(60) Provisional application No. 61/884,105, filed on Sep. 29, 2013.

(51) Int. Cl.
*G06K 9/54* (2006.01)
*G06Q 40/08* (2012.01)
*G06F 17/30* (2006.01)
*G06T 7/00* (2006.01)
*G06F 17/50* (2006.01)
*H04L 29/08* (2006.01)
*H04W 4/04* (2009.01)

(52) U.S. Cl.
CPC .......... *G06Q 40/08* (2013.01); *G06F 17/30268* (2013.01); *G06F 17/30277* (2013.01); *G06F 17/5004* (2013.01); *G06T 7/001* (2013.01); *H04L 67/10* (2013.01); *H04W 4/04* (2013.01)

(58) Field of Classification Search
None
See application file for complete search history.

(56) References Cited

U.S. PATENT DOCUMENTS

| 2,013,330 | A | * | 9/1935 | Abraham | ............... E04D 3/364 52/521 |
|---|---|---|---|---|---|
| 5,950,169 | A | | 9/1999 | Borghesi et al. | |
| 6,134,548 | A | | 10/2000 | Gottsman et al. | |
| 7,044,380 | B2 | | 5/2006 | Knehr-McLaren et al. | |
| 7,343,308 | B1 | | 3/2008 | Rojewski et al. | |

(Continued)

FOREIGN PATENT DOCUMENTS

| EP | 2251833 | 11/2010 |
|---|---|---|
| WO | 2009129496 | 10/2009 |

OTHER PUBLICATIONS

Canadian Intellectual Property Office, Office Action, Nov. 28, 2014, pp. 1-8, Canadian Intellectual Property Office, Gatineau, Quebec, Canada.

(Continued)

*Primary Examiner* — Eueng-Nan Yeh
(74) *Attorney, Agent, or Firm* — Middleton Reutlinger

(57) ABSTRACT

Methods and apparatus are disclosed for providing a roof guide, the method including: receiving, via an application on the mobile device of a user, a query related to one or more of a type of a roof and a type of damage to the roof; providing the query to a central server; retrieving, from the central server, at least one first roof image responsive to the query; receiving, via the application on the mobile device of the user, user input of a second roof image of a portion of the roof; and displaying, via the application on the mobile device of the user, the at least one first roof image and the second roof image.

33 Claims, 14 Drawing Sheets

(56) References Cited

U.S. PATENT DOCUMENTS

| | | |
|---|---|---|
| 7,530,494 B1 | 5/2009 | Streelman |
| 7,742,989 B2 | 6/2010 | Schultz |
| 7,962,385 B2 | 6/2011 | Falk et al. |
| 8,229,769 B1 | 7/2012 | Hopkins, III |
| 8,255,347 B2 | 8/2012 | Ellingsworth |
| 8,346,578 B1 | 1/2013 | Hopkins, III et al. |
| 8,452,125 B2 | 5/2013 | Schultz et al. |
| 8,515,125 B2 | 8/2013 | Thornberry et al. |
| 8,526,718 B2 | 9/2013 | Rao |
| 8,542,880 B2 | 9/2013 | Thornberry et al. |
| 8,600,827 B2 | 12/2013 | Fordyce et al. |
| 8,799,031 B2 | 8/2014 | Florence |
| 2002/0116254 A1 | 8/2002 | Stein et al. |
| 2002/0178046 A1 | 11/2002 | Lawrence |
| 2004/0111302 A1 | 6/2004 | Falk et al. |
| 2005/0010454 A1 | 1/2005 | Falk et al. |
| 2005/0267774 A1 | 12/2005 | Merritt et al. |
| 2006/0079252 A1 | 4/2006 | Obradovich et al. |
| 2006/0229933 A1 | 10/2006 | Stith |
| 2007/0174094 A1 | 7/2007 | Ramsey |
| 2007/0282824 A1 | 12/2007 | Ellingsworth |
| 2008/0077451 A1 | 3/2008 | Anthony et al. |
| 2008/0120852 A1 | 5/2008 | Ramsey |
| 2008/0243556 A1 | 10/2008 | Hogan et al. |
| 2009/0265193 A1 | 10/2009 | Collins et al. |
| 2009/0300065 A1 | 12/2009 | Birchall |
| 2010/0077310 A1 | 3/2010 | Karachale et al. |
| 2011/0096083 A1 | 4/2011 | Schultz |
| 2011/0138602 A1* | 6/2011 | Stanley ............... E04D 13/1407 29/428 |
| 2012/0101783 A1 | 4/2012 | Stephens et al. |
| 2012/0119889 A1* | 5/2012 | Carrillo ............... G08C 17/02 340/12.28 |
| 2013/0211790 A1 | 8/2013 | Loveland et al. |
| 2013/0226615 A1* | 8/2013 | Sakaue ............... G06F 19/36 705/3 |
| 2014/0019166 A1 | 1/2014 | Swanson et al. |

OTHER PUBLICATIONS

T.T. Vu; M. Matsuoka; and F. Yamazak; "Object-Based Image Analysis for Mapping Tsumani-Affected Areas," Proceedings of the 8th U.S. National Conference on Earthquake Engineering, Apr. 18-22, 2006, San Francisco, CA, USA, 10 pages, Apr. 18, 2006.

H. Rastiveis; F. Samadzadegan; P. Reinartz; "A fuzzy decision making system for building damage map creation using high resolution satellite imagery"; Nat. Hazards Earth Syst. Sci., 13, 455-472, 2013 Feb. 20, 2013.

T Oommen; U. Rebbapragada; D. Cerminaro (2012) Earthquake Damage Assessment Using Objective Image Segmentation: A Case Study of 2010 Haiti Earthquake In: Proceedings of the American Society of Civil Engineers, GeoCongress, Oakland, CA, USA, 10 pages, Jan. 1, 2012.

Precision Hawk; Lancaster Platform; Remote Sensing Overview Video; http://www.achive.is/x7077, 26 pages, Nov. 20, 2013.

Pictometry Solutions for Insurance; Pictometry Intelligent Images; http://pictometry.com/index.php?option=com_content&view=article, 2 pages, Jan. 24, 2014.

Thomas, J. (2010). Automated Damage Assessment from High Resolution Remote Sensing Imagery (Doctoral dissertation, University of Notre Dame). Jul. 31, 2010.

Lau, Albert; Canadian Office Action; Dec. 21, 2015.

* cited by examiner

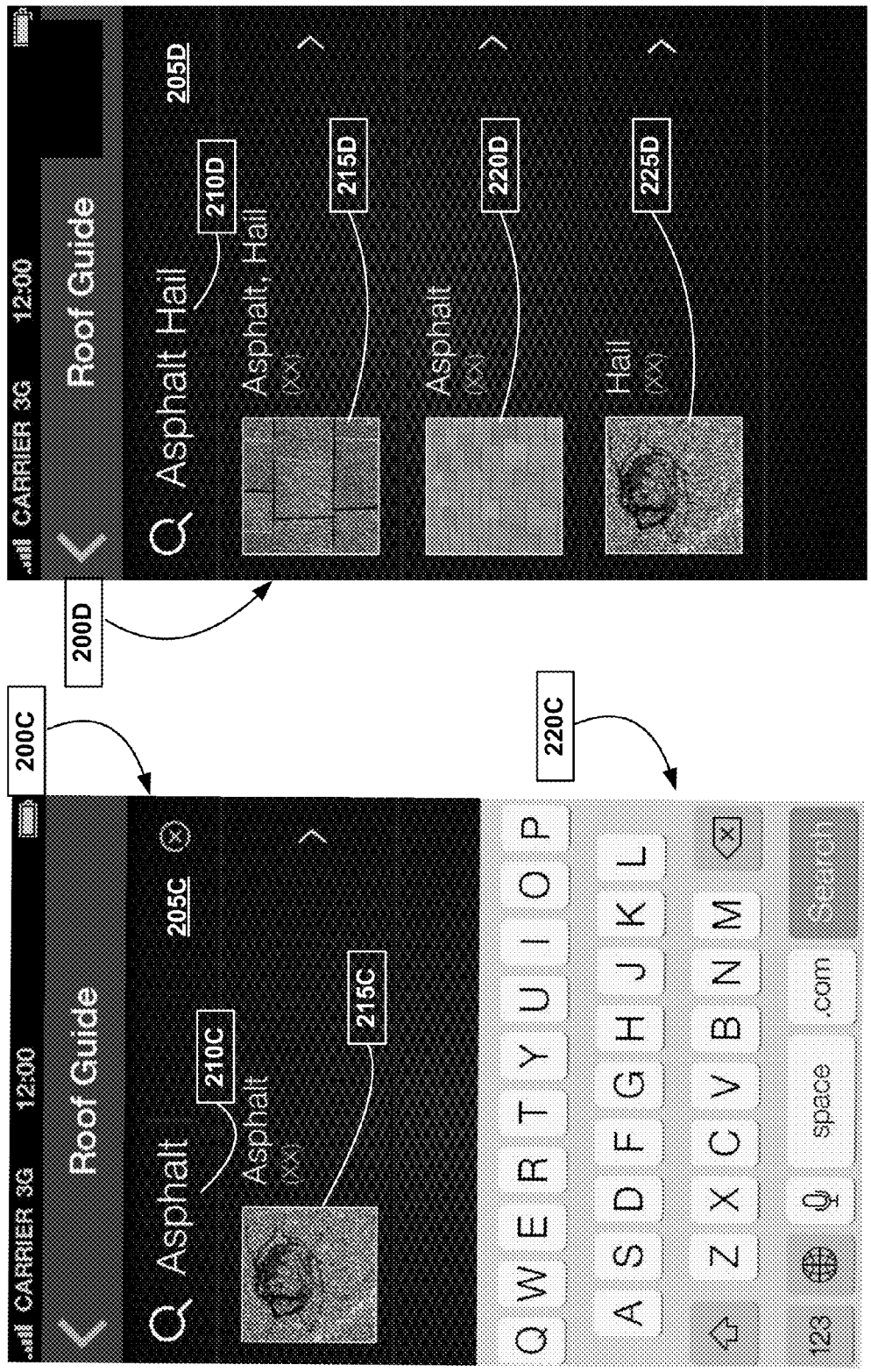

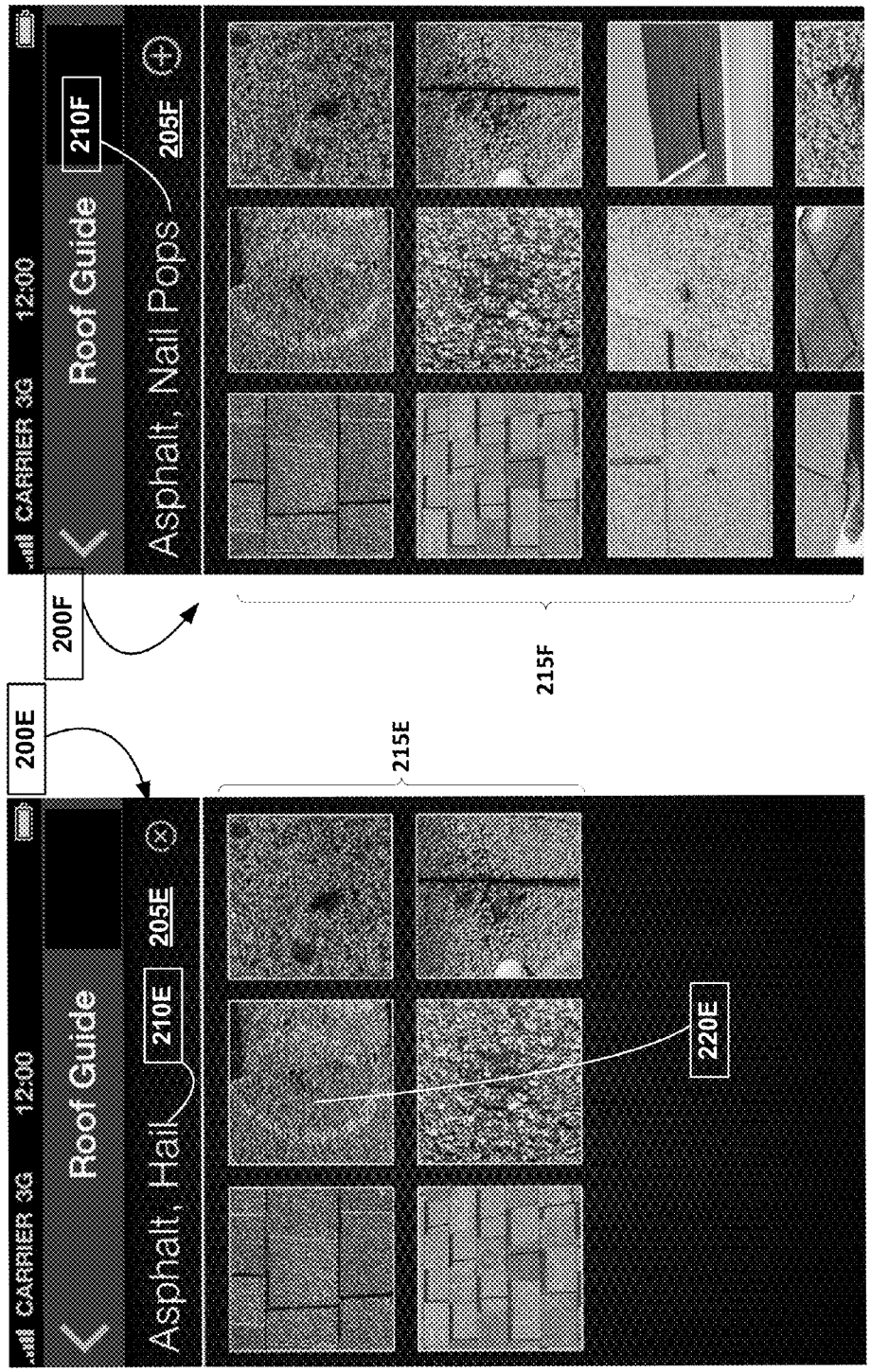

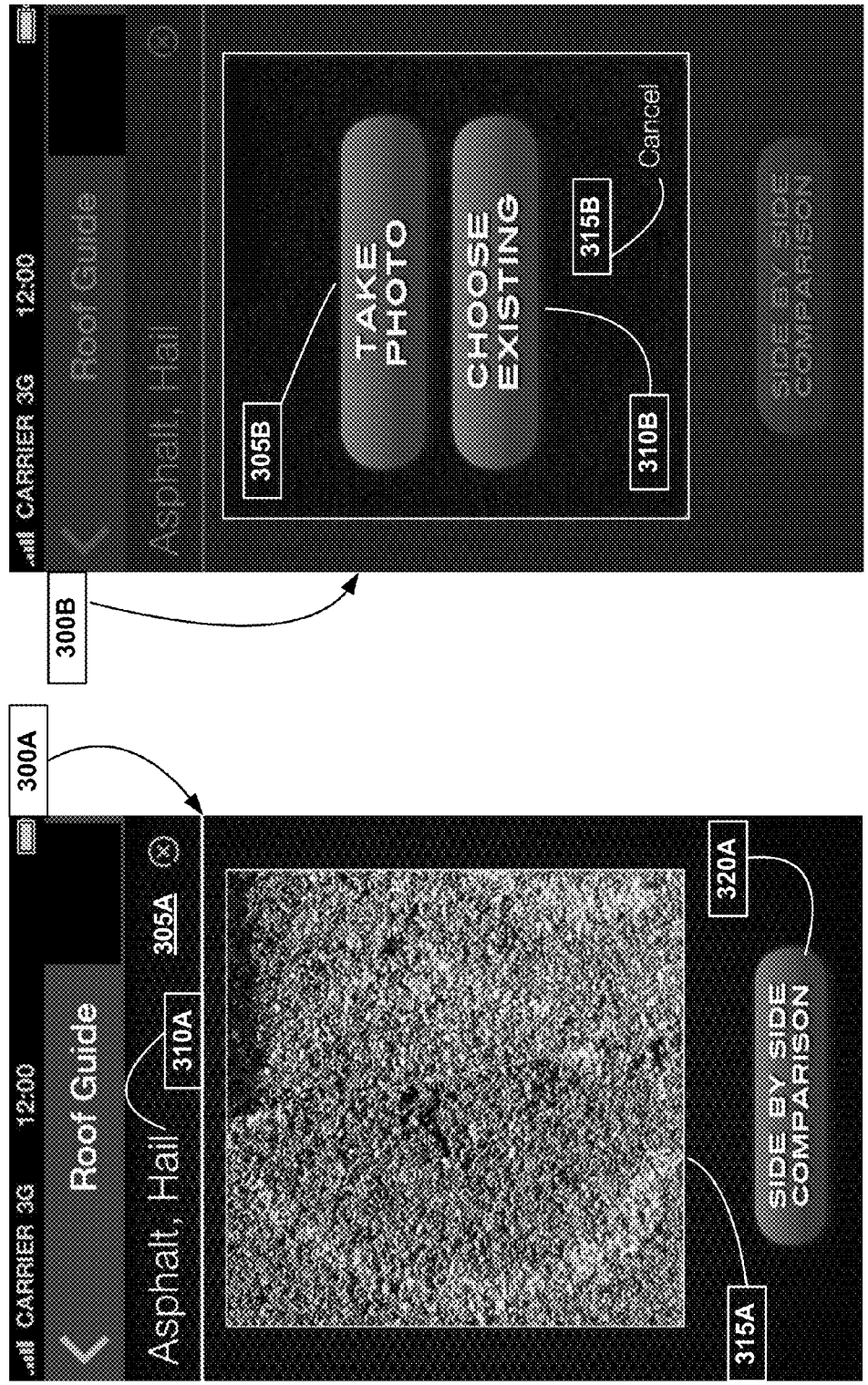

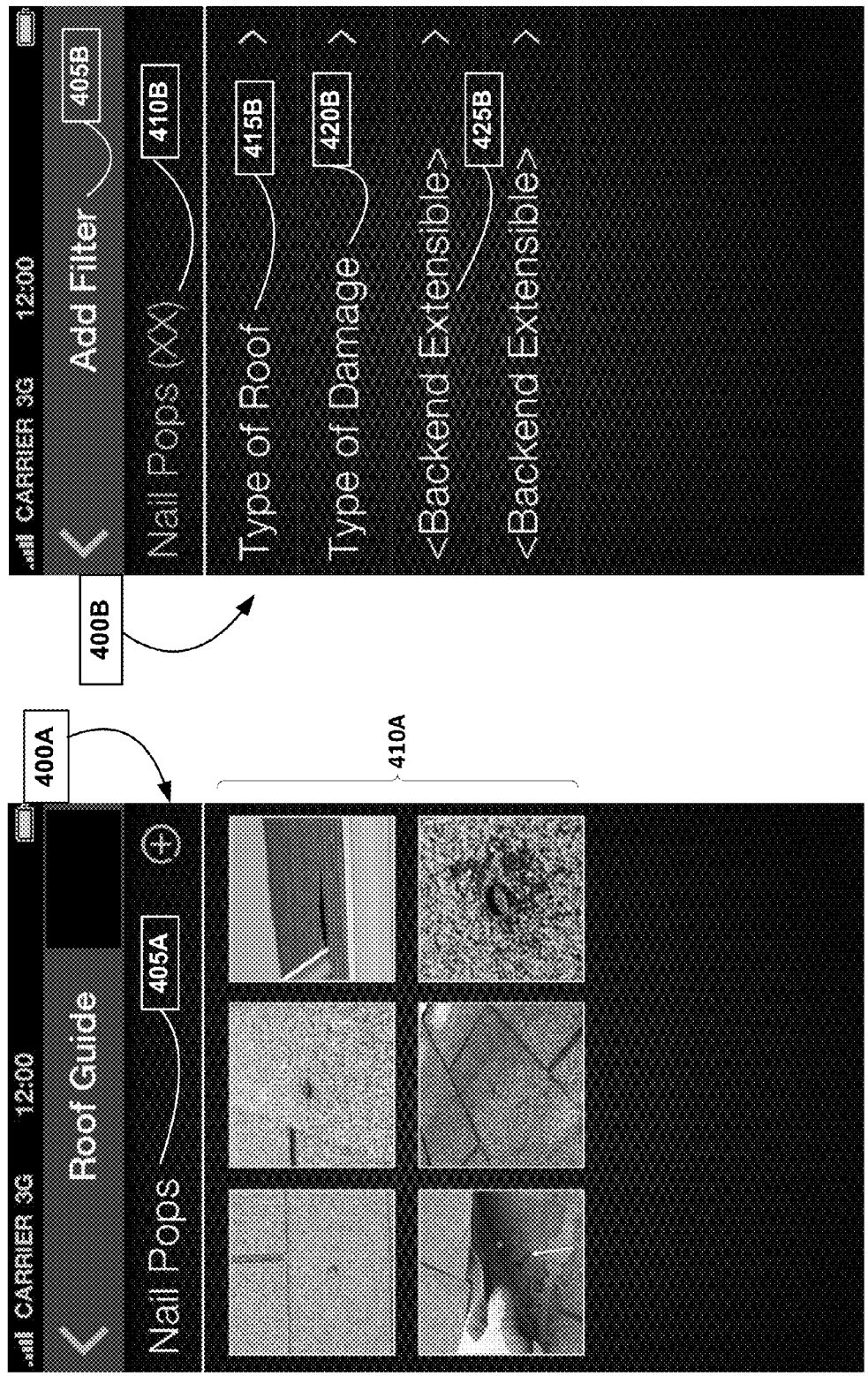

SYSTEMS AND METHODS FOR PROVIDING A ROOF GUIDE

CROSS REFERENCE TO RELATED APPLICATIONS AND CLAIM TO PRIORITY

This non-provisional application claims priority to and benefit under 35 U.S.C. §119(e) to U.S. Provisional Application No. 61/884,105 filed on Sep. 29, 2013, entitled "Systems and methods for identifying loss characteristics of products and determining subrogation opportunity relative to the products," the disclosure of which is incorporated by reference herein in its entirety.

STATEMENT REGARDING FEDERALLY SPONSORED RESEARCH

None.

REFERENCE TO SEQUENTIAL LISTING, ETC.

None.

BACKGROUND

Present embodiments are related to systems and methods for providing a roof guide. More particularly, the present embodiments are related to systems and methods for determining a type of roof and a type of damage.

A user may be inspecting a roof and may want to know the type of roof. In some instances the user may want to know the type of damage to a roof. Potential damage to a roof may be a result of several factors, including an event-related, a man-made factor, an installation defect, and a product-related factor. It is therefore desirable to have a roof guide that includes a database of reference images related to a type of roof, and/or a type of damage.

A roof guide may enable a user to identify the type of roof and/or the type of damage by comparing it to data available from the roof guide. For example, the user may capture an image of a damaged portion of a roof, compare the captured image to an image retrieved from the roof-related repository, and identify a type of roof and/or a type of damage based on the comparison. In some implementations the user may share the type of the roof and/or the type of the damage with one or more users via an electronic communication system, such as an electronic mail system, a text messaging system, and so forth.

SUMMARY

A method, implemented on a mobile device, is described that includes: receiving, via an application on the mobile device of a user, a query related to one or more of a type of a roof and a type of damage to the roof; providing the query to a central server; retrieving, from the central server, at least one first roof image responsive to the query; receiving, via the application on the mobile device of the user, user input of a second roof image of a portion of the roof; and displaying, via the application on the mobile device of the user, the at least one first roof image and the second roof image.

In some implementations, a method is described that includes: receiving, at a central server, a query from a mobile device, the query related to one or more of a type of a roof and a type of damage to the roof; searching, based on the query, one or more databases for at least one first roof image responsive to the query; providing the at least one first roof image to the mobile device; receiving, at the central server, a second roof image of a portion of the roof from the mobile device; and storing the second roof image in the one or more databases.

In some implementations, a method of using a roof guide is described, the method including: submitting a query via a mobile device, the query related to one or more of a type of a roof and a type of damage to the roof; receiving, via a graphical user interface on the mobile device, at least one first roof image responsive to the query; inputting a second roof image of a portion of the roof; comparing the at least one first roof image and the second roof image; and determining the one or more characteristics of the roof based on the comparing of the at least one first roof image and the second roof image, the one or more characteristics including the type of the roof and the type of damage to the roof.

These methods and other implementations of the technology disclosed can each optionally include one or more of features as described herein.

Other implementations may include a non-transitory computer readable storage medium storing computer instructions executable by a processor to perform the various methods described herein. Another implementation may include implementing the disclosed method and apparatus on an application running on a computing device (e.g., a mobile application on a mobile device, a downloadable application on a desktop computer, and so forth).

The details of one or more embodiments of the technology disclosed in this specification are set forth in the accompanying drawings and the description below. Additional features, aspects, and advantages of the technology disclosed will become apparent from the description, the drawings and the claims.

BRIEF DESCRIPTION OF THE DRAWINGS

FIGS. 2A-2F illustrate example graphical user interfaces for searching one or more databases.

FIGS. 3A-3C illustrate example graphical user interfaces for comparison of images for a roof.

FIGS. 4A-4E illustrate one or more aspects of a roof guide.

DETAILED DESCRIPTION

Figure 1:
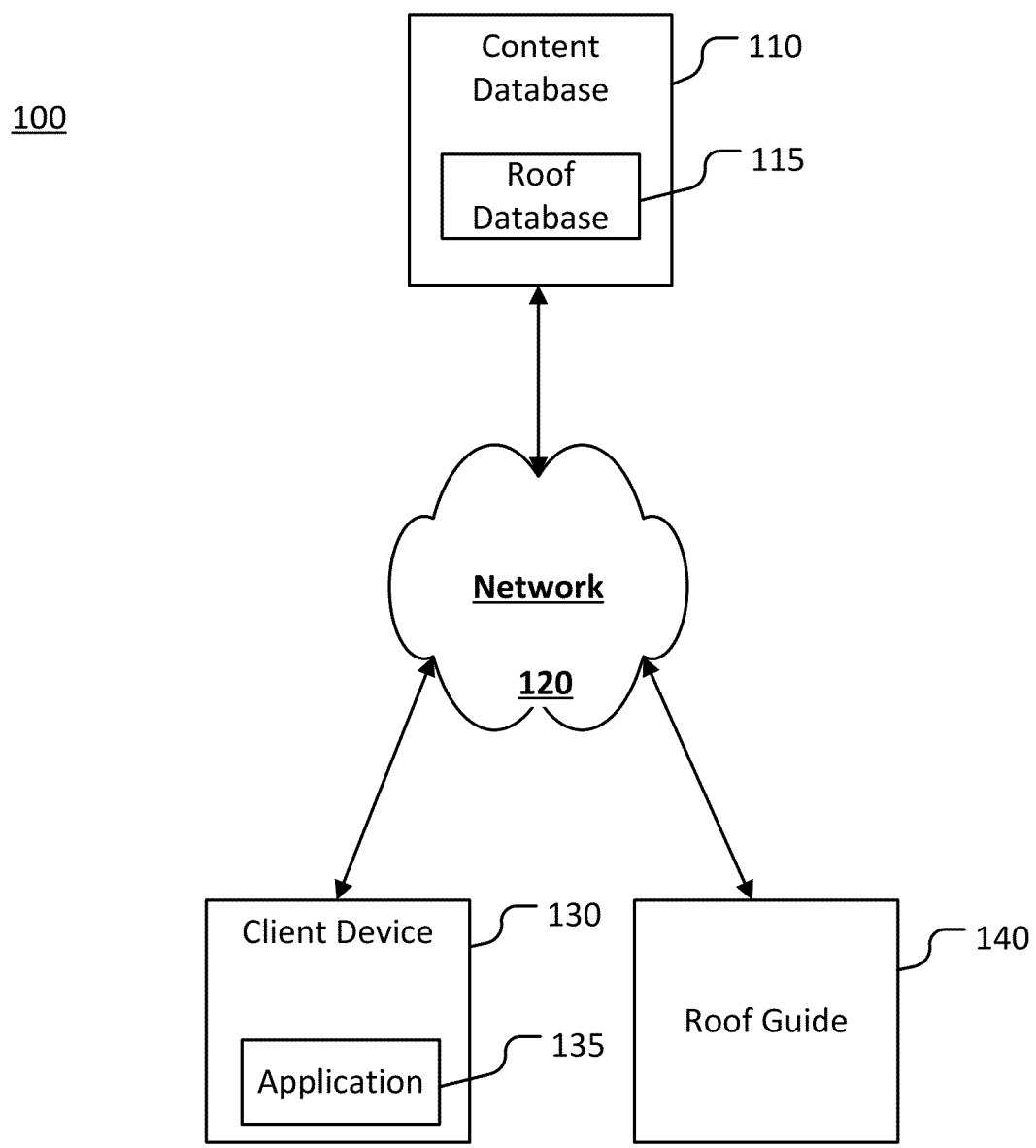
FIG. 1 illustrates a block diagram of an example environment for providing characteristics of a roof.

FIG. 1 illustrates a block diagram of an example environment for damage assessment of a roof. The process environment 100 includes a roof guide 140, and one or more client devices 130. The process environment 100 also includes a network 120 that allows for communication between various components of the process environment 100. The example environment 100 further includes a content database 110. In some implementations, a roof database 115 may be included in the content database 110. In some implementations one or more components, or parts thereof, of the process environment 100 may reside on the client device 130.

In some implementations one or more components, or parts thereof, of the roof guide 140 may reside on the client device 130. In some implementations the roof database 115 may be included in the roof guide 140. In some implementations the roof database 115 may be an independent component of the process environment 100. A variety of end users may interact with the roof guide 140 through the client devices 130. The client devices 130 include memory for storage of data and software applications, a processor for accessing data and executing applications, and components that facilitate communication over the network 120 in the process environment 100. The client devices 130 may execute applications, such as application 135, that allow clients to interact with the graphical user interfaces as described herein. Application 135 may include applications such as a mobile roof guide application, and/or an application for a mobile camera.

Roof Guide—Mobile Application Processes

A query related to one or more of a type of a roof and a type of damage to the roof may be received via an application on the mobile device of a user. For example, a mobile application may be downloaded and installed onto a client device 130. The mobile application may be configured to receive the query related to the roof. For example, one or more data entry fields may be provided for the input of data, and the user may input a query related to the type of the roof and/or the type of damage to the roof. The roof may be domestic or commercial.

In some implementations the type of roof may include one or more of shingle, ceramic, membrane, metal, and concrete. Generally speaking, ventilation and insulation are two significant functions of a roof. Also significant is the ability of the roof to withstand weather-related elements such as wind, hail, and water. Accordingly, the type of roof may be selected to perform such functions. For example, the size of a house may determine the weight of a roof that the house may support, and the type of roof may be selected based on the weight requirements. For example, materials such as slate, stone, and tile are heavy, and may be unsuitable for houses that cannot support their weight.

In some implementations the shingle type of roof may include one or more of wood, slate, asphalt, synthetic rubber, and stone. For example, the type of roof may be asphalt shingle. Generally speaking, an asphalt shingle is made of a fiberglass medium that has been treated with asphalt and given a granular, sand-like surface. Also, for example, the type of roof may be asphalt wood, where the wood may be obtained from cedar, pine, and/or redwood.

In some implementations the membrane type of roof may include one or more of thermoset membrane, thermoplastic sheets, and synthetic polymer. In some implementations the metal type of roof may include one or more of galvanized steel, copper, and stone coated metal. Also, for example, the metal type of roof may include aluminum, and copper-and-asphalt.

Additional and/or alternative types of roof may include dimensional-style, three-tab, EPDM (Rubber), tile, built-up roof ("BUR"), modified bitumen, installation, commercial, plumbing boot, residential, double-S-profile, man-made, fiberglass mat, organic felt, collateral indicators, S-profile, flat roof, flat profile, thermoplastic roof ("TPO"), spray-applied foam ("SPF"), concrete or clay, dimensional-style asphalt, sliding, and barrel profile.

In some implementations the type of damage may include damage related to one or more of underdriven nail, overdriven layer, applique layer, sealant strip failure, vertical racking, crooked nailing, high nailing, crazing, balding, inadequate drainage, ballpeen hammer, missing nail, wind, toe-board nail holes, delamination, granule loss, moss growth, tarp, lichen growth, underdriven, installation, hail, blistering, inadequate repair, unsealed plumbing boot, lamination failure, sliding, collateral indicators, maintenance, fiberglass mat, streaking, splitting, creasing, voids, improper repair, deterioration, tearing, material failure, cracking, granule impurities, nature, seam failure, nail pop, tool gouges, repair, coining, manufacturer defect, age-related damage, bird damage, animal damage, man-made damage, inadvertent damage, and intentional damage.

For example, many parts of the United States are susceptible to hail, and there is an average of 3,000 hailstorms a year. During a hailstorm, descriptors that include the size of hail, the duration of a hailstorm, and wind direction, may be correlated to the type and extent of damage to a roof based on logs of past disaster response and recovery efforts. This assessment may additionally factor in the type of roofing used.

As another example, during ice storms, physical damage may be caused by fire from downed power lines, or damage to a roof from fallen trees or tree limbs, or acute damage as a result of ice damming. Heavy rain from tropical storms or a thunderstorm may cause problems around a roofing structure. Rain-related problems include water leaking into the framing of the roof. Roof systems may be damaged by snow, when excessive snow accumulates on the roofing structure. Steel-framed roofing structures may also be damaged by excessive snowing that causes loads to exceed the expected loading.

Roof damage may be from a weather related event (e.g., thunderstorm, tornado, snowstorm, hailstorm, lightning, wind, fire), a natural event (e.g., earthquake, tsunami, floods, volcanoes, avalanches), and/or a human induced event (e.g., wars, fires, train derailments, spills, releases, automobile crashes, airplane crashes, and so forth). Also, for example, the roof damage may be caused by a hurricane, a land movement (e.g., landslide, sinkhole, and erosion), fire, smoke, and ash.

The damage may be cosmetic, repairable, and/or functional. Cosmetic damage may include temporary damage that may simply go away with time, and/or damage that may cause negligible loss of value to the roof. For example, the roof may receive temporary scratch marks from hail impact. For instance, the hail may be minimal in size to cause any real damage to the roof. Repairable damage may occur when the damage may be repaired. For example, a few shingles on the roof may be damaged due to high wind, and replacing these damaged shingles may be sufficient to repair the roof. Also, for example, hail may impact a roof, but only portions such as ridge caps and valleys may have been impacted, beyond cosmetic damage. Such damaged portions may be repairable. Functional damage may occur when the damage is significant to cause functional failure of the utility of the roof. For example, high wind may cause considerable damage to a roof such that replacing a few shingles may not make the roof functional. Also, for example, hail impact may be so great as to cause considerable damage to the roof. In such instances, the roof may need to be replaced to make it functional.

In some implementations receiving the query may include receiving the query as a search query. For example, the user may enter a search term in a search field, and the mobile application may identify the entry of the search term as the query. As another example, the user may speak out aloud the type of roof, and the mobile application may process such audio input as the query. In some implementations receiving the query as a search query may include providing a first data entry field for the search query, and identifying entry of data in the data entry field. For example, the mobile application on the client device 130 may provide a data entry field, and the user may type in the type of roof. The typing may be, for example, done using a virtual keyboard, a stylus, a speech-to-text processor, and so forth.

In some implementations, in response to the query, the query may be provided to the central server. For example, application 135 may send the query to the roof guide 140. The roof guide 140 may access one or more databases, such as the roof database 115 to search for information related to the query. For example, the user may input "Shingle" and the query may be forwarded to the roof guide 140. The roof guide 140 may search the roof database 115 for information related to the term "Shingle".

In some implementations at least one first roof image may be retrieved from a roof database. For example, the roof guide 140 may retrieve one or more images of a roof made of different types of shingle from the roof database 115. As another example, the roof guide 140 may retrieve one or more images of the types of roof made of "Shingle". Also, for example, the roof guide 140 may retrieve one or more images of the types of damages to a roof made of "Shingle".

In some implementations the at least one first roof image may include a before-image of the roof. For example, the roof database 115 may be a repository of roof images for one or more commercial and/or residential properties. Such roof images may include one or more of a satellite image, an aerial image, a street view, and a topographic view. In some implementations the aerial image may be based on image data from one or more of a fixed wing aircraft, a rotating wing aircraft, an unmanned aerial vehicle ("UAV") such as a drone, and a balloon (e.g., a weather balloon). In some implementations the image data may include a video. For example, the UAV may provide a video of one or more roofs and such video may be stored in the roof database 115.

The aerial vehicle may be configured to collect aerial image data. For example, a UAV may be remotely controlled via a remote control and monitoring system and the UAV may be configured to capture vertical and oblique photographs. Vertical photographs may be taken straight down, substantially perpendicular to the ground. Vertical photographs may allow the determination of relative positions of objects on a flat surface without regard to their heights. For example, a vertical photograph of a block of houses may show the roofs as flat surfaces and may not distinguish between their relative differences in height.

Oblique photographs may be taken at an angle to the horizon. Satellites and large aircrafts typically fly at a high altitude, and are less maneuverable. Accordingly, they may be incapable of taking oblique photographs. On the other hand, UAVs may be capture oblique photographs based on their capability to fly at a low altitude, and also based on their capability to fly at various angles. Accordingly, UAVs may have the capability to capture photographs of objects from a closer perspective, providing higher resolution digital photographs. Also, for example, UAVs may be deployed in areas that may be inaccessible. For example, flooded regions, forest fires, and so forth may be inaccessible for direct observation. However, a UAV may be flown of the geographic area and the UAV may be configured to take vertical and/or oblique photographs.

UAVs may also capture video, based on an ability to fly for longer periods of time, along with an ability to provide a substantially stable mounting platform for a camera. UAVs may also capture oblique photographs. Oblique photographs may present a three-dimensional picture (e.g., perspective view) of the roofs as well as of the lateral surfaces (e.g., walls, a view of the inside of a room via a window). Accordingly, the relative positions of objects on a flat surface may be obtained along with their shape. Moreover, oblique photography may allow for the determination of the heights of objects relative to each other. Also, for example, a plurality of oblique photographs taken with a camera rotating about a vertical axis may be converted into a panoramic image, including a full 360-degree cyclorama. In some implementations aerial panoramas may be made by specially equipped remote-controlled helicopters. Such aerial vehicles may hover at a predetermined height for a longer time while shooting adjacent frames.

In some implementations the at least one first roof image may include a reference image based on one or more of the type of roof and the type of damage. For example, the images in the roof database 115 may be cataloged and linked based on one or more of the type of roof and the type of damage. For example, a node representing the term "Shingle" may be linked to nodes representing the types of roofs made of shingle, to nodes representing one or more types of damages related to shingle, and/or to nodes representing images of the types of roofs made of shingle and/or images of the types of damages related to shingle. As another example, a node representing the term "Hail" may be linked to nodes representing one or more of the type of roof and the type of damage associated with "Hail".

FIGS. 2A-2F illustrate example graphical user interfaces for searching one or more databases.

Figures 2A, 2B:
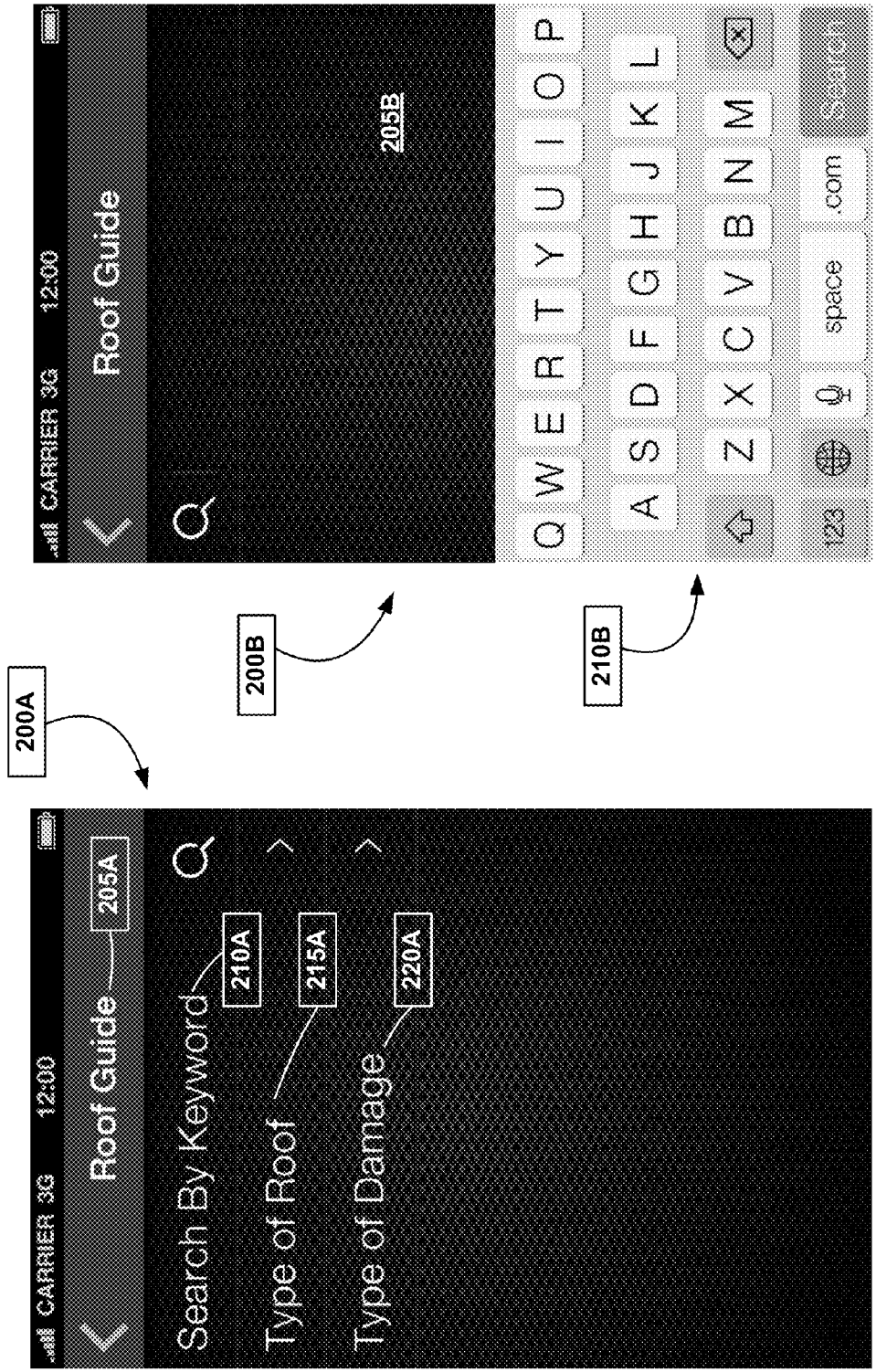

Referring now to FIG. 2A, a graphical user interface 200A is illustrated providing the one or more selectable menus that may be displayed when the user selects the selectable menu representing a "Roof Guide" 205A. The one or more selectable menus may include the at least one query suggestion, including an option to "Search by Keyword" 210A, "Type of Roof" 215A, and "Type of Damage" 220A.

Referring now to FIG. 2B, a graphical user interface 200B is illustrated providing the user with a data entry field 205B for entry of the query to search the one or more databases. The query may be entered via a virtual keyboard 210B. For example, the user may input a query such as "Asphalt".

Referring now to FIG. 2C, a graphical user interface 200C is illustrated. The user may enter the query "Asphalt" 210C in the data entry field 205C. In some implementations in response to the query, a mobile application may provide the query to the central server, and retrieve at least one first roof image from the one or more databases. For example, the query "Asphalt" 210C may be provided to the roof guide 140. The roof guide 140 may search the roof database 115 for information related to the term "Asphalt". The at least one first roof image 215C may be retrieved. Also illustrated is a virtual keyboard 220C. The virtual keyboard 220C may be utilized to edit the query in the data entry field 205C.

Referring now to FIG. 2D, a graphical user interface 200D is illustrated. FIG. 2D illustrates a plurality of images that represent Asphalt roofs with hail damage. The user may enter the query "Asphalt Hail" 210D in the data entry field 205D. In some implementations in response to the query, the mobile application may provide the query to the central server, and retrieve at least one first roof image from the one or more databases. For example, the query "Asphalt Hail" 210D may be forwarded to the roof guide 140. The roof guide 140 may search the roof database 115 for information related to the term "Asphalt Hail". A first roof image 215D may be associated with the terms "Asphalt" and "Hail", a second roof image 220D may be associated with the term "Asphalt", and a third roof image 225D may be associated with the term "Hail". The system may retrieve such images from the one or more databases, such as the roof database 115, to aid the user in identifying the type of roof and/or the type of damage.

Referring now to FIG. 2E, a graphical user interface 200E is illustrated. FIG. 2E illustrates a plurality of example images that represent Asphalt roofs with hail damage. The user may enter the search query "Asphalt, Hail" 210E in the data entry field 205E. Images 215E may be retrieved in response to the search query. For example, image 220E illustrates hail damage to an asphalt roof.

Referring now to FIG. 2F, a graphical user interface 200F is illustrated. FIG. 2F illustrates a plurality of example images that represent Asphalt roofs with damage due to Nail Pops. The user may enter the search query "Asphalt, Nail Pops" 210F in the data entry field 205F. Images 215F may be retrieved in response to the search query.

In some implementations the user may be provided with one or more selectable menus to input a second roof image of a portion of the roof. For example, the user may be provided with an option to input the second roof image from an existing repository of images, and/or the user may be prompted to take an image of the roof. In some implementations the user may access stored images of the roof from the client device 130. For example, an insurance adjuster may be inspecting a damaged roof, and may capture one or more images using a camera. Such images may then be accessible from the adjuster's client device 115. For example, the adjuster may forward images from a camera to the client device 115.

In some implementations the one or more selectable menus to input the second roof image may include a first menu to select the second roof image from an existing repository of images, such as the roof database, and a camera menu to capture a camera image of the roof. For example, the first menu may state "Choose Existing" to prompt the user to select an image from an existing repository of images. The camera menu may state "Take Photo" to prompt the user to capture the camera image with a mobile camera. In some implementations the user may select the first menu to select the second roof image from an existing repository of images, and the mobile application 135 may identify the selection of the first menu. In response to the selection of the first menu, the mobile application 135 may provide the user access to images on the client device 130, and/or may retrieve images from the roof database 115, and provide the user with these images to select from. For example, such images may be provided in selectable form, such as a selectable checkbox accompanying the image.

In some implementations selection of the camera menu to capture the camera image may be identified, and the mobile camera may be provided to capture the camera image. In some implementations the client device 130 may be configured to include the mobile camera. The mobile camera may have the capability to capture still images, video images, audio, and so forth. A mobile roof guide application on the client device 130 may be configured so as to be compatible with the mobile camera. For example, upon selection of the camera menu, the mobile application may invoke an application for the mobile camera, and interactively provide the user access to the mobile camera via the mobile roof guide application.

In some implementations identifying the user input of the second roof image may include receiving, via the mobile camera, the camera image. For example, the mobile roof guide application may invoke the application for the mobile camera, and the user may capture the camera image via the mobile camera. The camera image may include a still photograph, a video, and/or an image accompanied by an audio. The application for the mobile camera may forward the camera image to the mobile roof guide application, which may in turn identify the camera image as the second roof image.

In some implementations the camera image may be provided to the central server for storing in the roof database. For example, the mobile roof guide application may forward the camera image to the roof database 115.

In some implementations the at least one first roof image and the second roof image may be displayed via the application on the mobile device of the user. For example, the user may be inspecting potential hail damage to a roof made of Asphalt. The user may have selected at least one first roof image based on a query for "Asphalt, Hail". The user may capture a camera image of a portion of the roof. The mobile roof guide application may provide the user with the at least one first roof image and the second roof image. In some implementations the at least one first roof image and the second roof image may be displayed simultaneously on a mobile display. The user may be able to make a side-by-side comparison of the at least one first roof image and the second roof image. For example, the at least one first roof image may be an image of an undamaged asphalt roof. Comparison of the second roof image with the image of the undamaged asphalt roof may indicate the type and/or extent of damage to the roof. Also for example, the at least one first roof image may be a before-image of a roof being inspected. The before-image may indicate existing damage from a prior hail impact, and/or an impact from a golf ball. Comparison of the second roof image with the before-image may indicate the type and/or extent of damage to the roof, given that the roof was partially damaged.

In some implementations displaying the at least one first roof image and the second roof image may further include providing a second data entry field for input of data, and receiving the input of data in the second data entry field, the input of data based on a comparison of the at least one first roof image and the second roof image. For example, the insurance adjuster may be provided with the second data entry field, and the insurance adjuster may type in comments based on the comparison of the second roof image with the image of the undamaged asphalt roof. Also, for example, the insurance adjuster may be provided with the second data entry field, and the insurance adjuster may input audio that includes comments based on the comparison of the second roof image with the before-image. In some implementations the method may include providing the input of data to the central server for storing in the roof database. For example, the mobile roof guide application may forward the input of data to the roof database 115. In some implementations the input of data may include one or more of a text input, an audio input, an image input, and a video input.

Figure 3C:
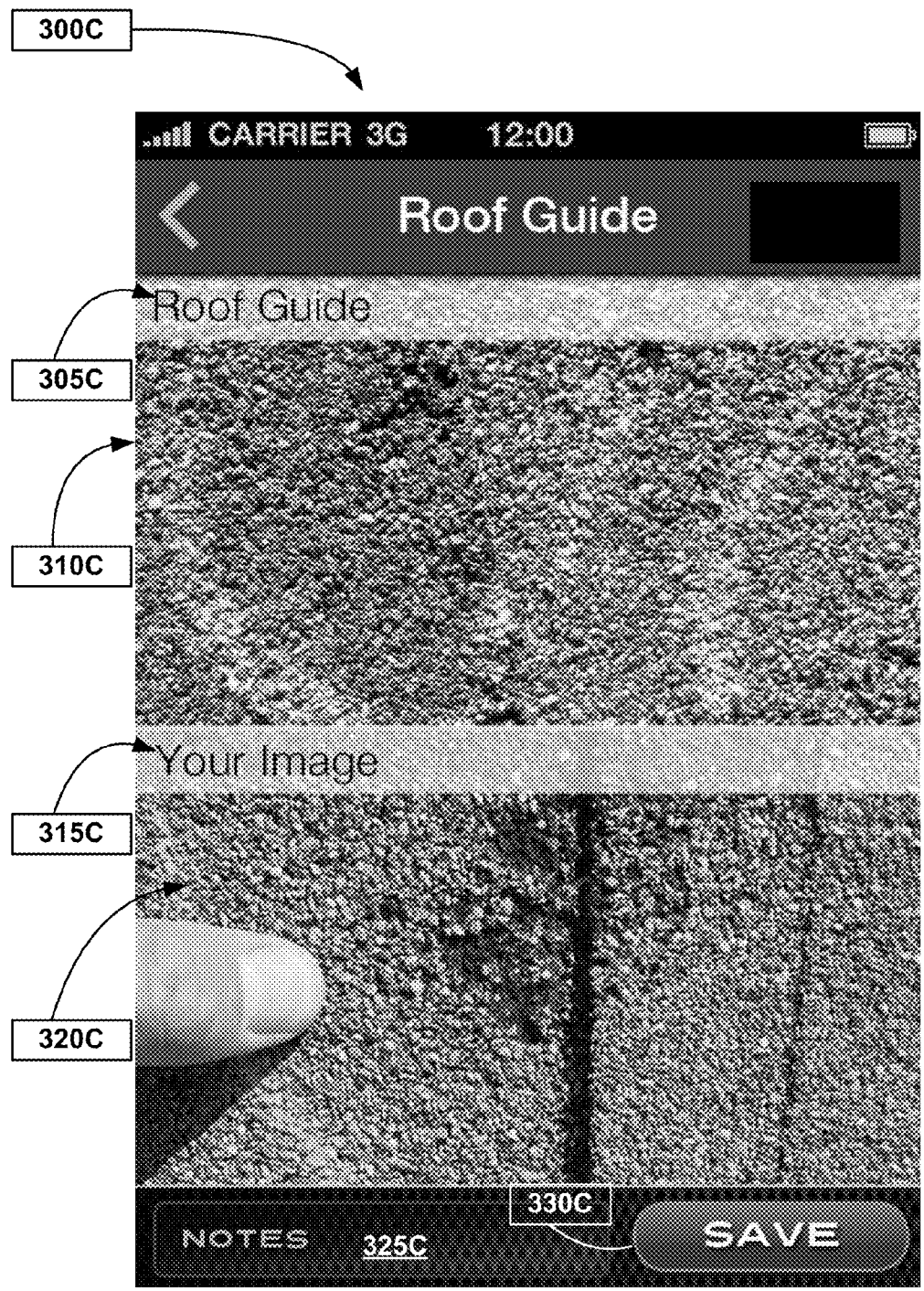

FIGS. 3A-3C illustrate example graphical user interfaces for comparison of images for a roof.

Referring now to FIG. 3A, a graphical user interface 300A is illustrated. The user may enter a search query "Asphalt, Hail" 310A in the data entry field 305A. As described with reference to FIG. 2E, a plurality of images may be provided in response to the search query 310A. In some implementations the user may select image 220E (illustrated in FIG. 2E). This image may be displayed as image 315A via the graphical user interface 300A. The displayed image 315A of the roof may be provided with a selectable menu option for "Side by Side Comparison" 320A. Upon selection of this selectable menu, the user may be directed to the next step in the process flow, as illustrated in FIG. 3B.

Referring now to FIG. 3B, a graphical user interface 300B is illustrated providing the one or more selectable menus that may be displayed when the user selects the selectable menu representing the step: select "Side by side comparison". The user is provided with additional selectable options, representing alternative steps in the process flow. The first selectable menu option may represent "Take a Photo" 305B. This menu option prompts the user to take a photograph of the roof. As described herein, selection of the "Take a Photo" 305B option may invoke a mobile application for a mobile camera that enables the user to capture a camera image of the roof. The other selectable menu option may represent "Choose existing" 310B. In this instance, the user may be provided with an option to select an existing image that may have been stored in the one or more databases on a server and/or on the mobile device. A third selectable option to "Cancel" 315B may be provided. Selecting this option would terminate the side by side comparison.

Referring now to FIG. 3C, a graphical user interface 300C is illustrated providing the one or more selectable menus that may be displayed when the user selects the selectable menu representing the step: select "Take a Photo" (as illustrated with reference to FIG. 3B). As illustrated, two images may be provided for comparison purposes. The image on top may be obtained from the "Roof Guide" 305C, and may be the at least one first image 310C (e.g., image 315A in FIG. 3A). The image at the bottom may be obtained "Your Image" 315C, and may be the camera image 320C captured by the user via the mobile camera integrated into the mobile device. In some implementations the two images may be visually compared side by side to determine the type of roof and/or the type of damage. In some implementations the two images may be compared by utilizing one or more image processing techniques. In some implementations measures of similarity may be determined to further quantify the comparisons. A higher measure of similarity may be more indicative of the two images being similar. For example, a second roof image may be compared with a first roof image with hail characteristics. A higher measure of similarity may allow a logic module configured into the process environment 100 to conclude that the type of damage associated with the impact is from hail. The graphical user interface 300C may include another data entry field for "Notes" 325C. As described herein, the user may enter notes related to the comparison of the at least one first roof image and the second roof image. A selectable menu option "Save" 330C may be selected to save the data.

In some implementations a gear icon may be provided. Selection of the gear icon may allow the user to calibrate the tool, and/or seek help in using the tool. In some implementations the Notes 325C, the captured image, and/or other data may be shared with one or more users via communication systems such as an electronic mail system, text messaging system, and so forth. In some implementations the sharing may be achieved via a share icon.

FIGS. 4A-4E illustrate one or more aspects of a roof guide.

Referring now to FIG. 4A, a graphical user interface 400A is illustrated. FIG. 4A illustrates a plurality of example images that represent roofs with damage due to Nail Pops. The user may enter the search query "Nail Pops" 405A and a plurality of images 410A may be retrieved in response to the search query.

Referring now to FIG. 4B, a graphical user interface 400B is illustrated. FIG. 4B illustrates the addition of one or more filters to the search for the at least one first roof image. A caption "Add Filter" 405B indicates that one or more filters may be added. A first search query may be entered for "Nail Pops" 410B. One or more selectable menus may be provided to filter the search, including a filter indicating a "Type of Roof" 415B, and a "Type of Damage" 420B. For example, the user may select the filter indicating a "Type of Roof" 415B and enter "Metal" to identify potential damage to a metal roof from Nail Pops. Also, for example, the user may select the filter indicating a "Type of Damage" 420B and enter "Hail" to identify potential damage from Nail Pops and Hail. Additional filters 425B may be provided as well.

Figures 4C, 4D:
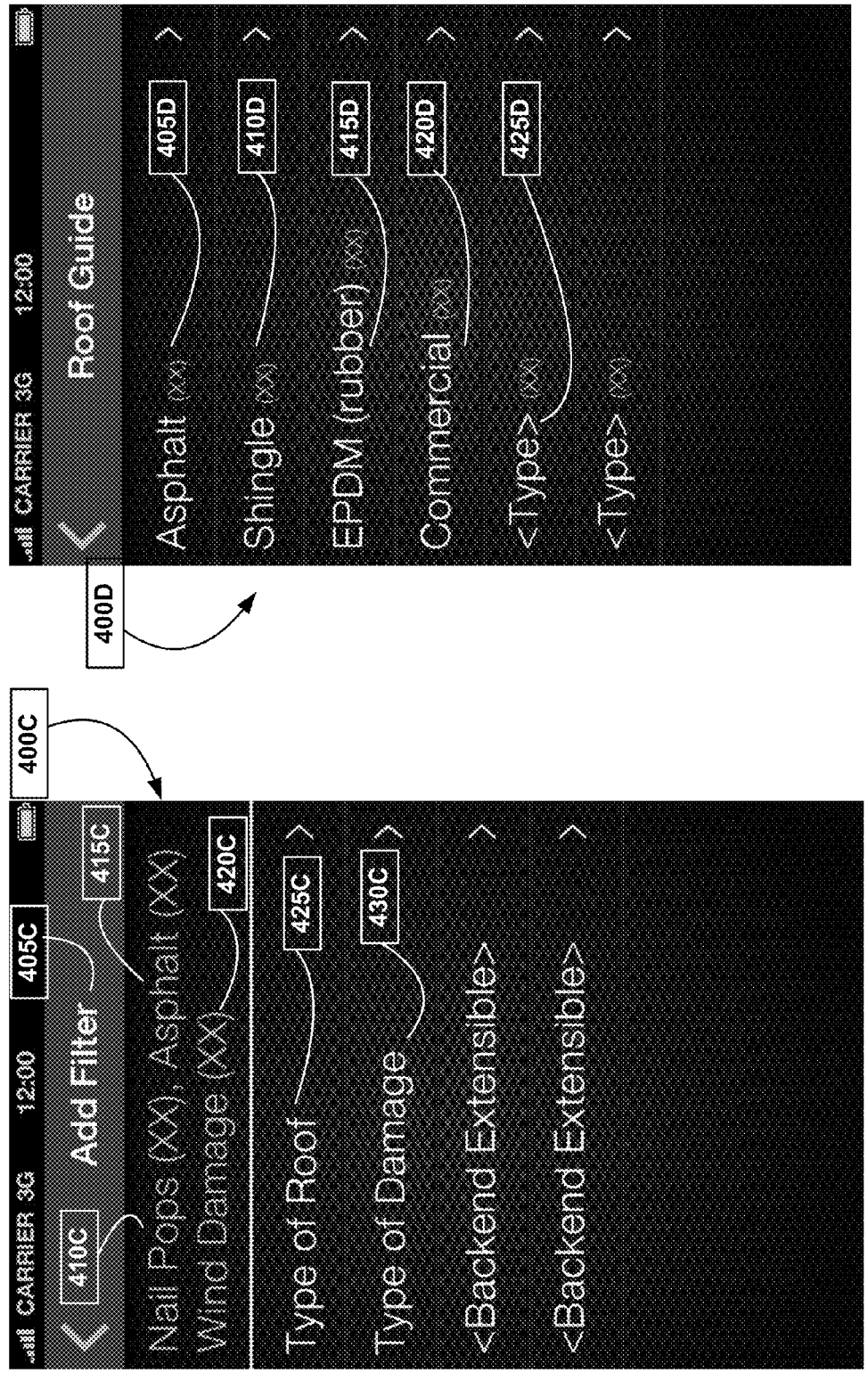

Referring now to FIG. 4C, a graphical user interface 400C is illustrated. FIG. 4C illustrates the addition of one or more filters to the search for the at least one first roof image. A caption "Add Filter" 405C indicates that one or more filters may be added. A first search query may be entered for "Nail Pops" 410C. Additional filters may be added as described with reference to FIG. 4A. For example, a filter for a type of roof, "Asphalt" 415C, and a filter for a type of damage, "Wind Damage" 420C, may be added. Additional filters may be added via the one or more selectable menus, including a filter indicating a "Type of Roof" 425C, and a "Type of Damage" 430C.

Referring now to FIG. 4D, a graphical user interface 400D is illustrated providing one or more selectable menus that may be displayed when the user selects the selectable menu "Type of Roof". The one or more selectable menus may include menus representing the at least one query suggestion, including identifying the type of roof as "Asphalt" 405D, "Shingle" 410D, "EPDM (rubber)" 415D, "Commercial" 420D, and so forth. Additional and/or alternative query suggestions for the type of roof may be provided, including dimensional-style, three-tab, EPDM (Rubber), tile, built-up roof ("BUR"), modified bitumen, installation, commercial, plumbing boot, residential, double-S-profile, man-made, fiberglass mat, organic felt, collateral indicators, S-profile, flat roof, flat profile, thermoplastic roof ("TPO"), spray-applied foam ("SPF"), concrete or clay, dimensional-style asphalt, sliding, and barrel profile. Menu 425D for an additional type of roof may be provided. In some implementations the user may be provided with one or more data entry fields to enter additional and/or alternate types of roofing material.

Figure 4E:

Referring now to FIG. 4E, a graphical user interface 400E is illustrated providing one or more selectable menus that may be displayed when the user selects the selectable menu "Type of Damage". The one or more selectable menus may include menus representing the at least one query suggestion, including identifying the type of damage as "Wind", "Manufacturer's Defects", "Nail Pops", "Man-made Damage", and so forth. Menu 425E for an additional type of damage may be provided. In some implementations the user may be provided with one or more data entry fields to enter additional and/or alternate types of damage to a roof. Additional and/or alternative query suggestions for the type of damage may be provided, including underdriven nail, overdriven layer, applique layer, sealant strip failure, vertical racking, crooked nailing, high nailing, crazing, balding, inadequate drainage, ball-peen hammer, missing nail, wind, toe-board nail holes, delamination, granule loss, moss growth, tarp, lichen growth, underdriven, installation, hail, blistering, inadequate repair, unsealed plumbing boot, lamination failure, sliding, collateral indicators, maintenance, fiberglass mat, streaking, splitting, creasing, voids, improper repair, deterioration, tearing, material failure, cracking, granule impurities, nature, seam failure, nail pop, tool gouges, repair, coining, manufacturer defect, age-related damage, bird damage, animal damage, man-made damage, inadvertent damage, and intentional damage.

Figure 5:
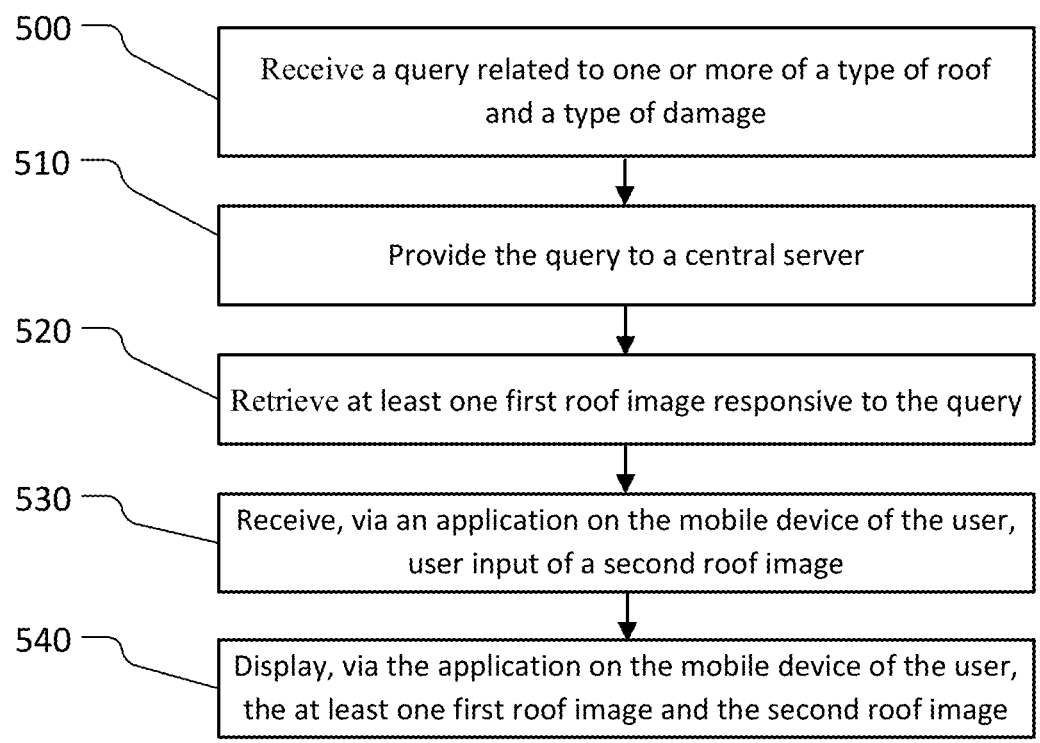
FIG. 5 is a flow diagram of an example process, implemented on a mobile device, for providing a roof guide.

FIG. 5 illustrates a flow diagram of an example process, implemented on a mobile device, for providing a roof guide. For convenience, the method 500-540 will be described with respect to a system that performs at least parts of the method. Other implementations may perform the steps in a different order, omit certain steps, and/or perform different and/or additional steps than those illustrated in FIG. 5. For convenience, aspects of FIG. 5 will be described with reference to a system of one or more computers that perform the process. The system may include, for example, one or more components of FIG. 1.

At step 500, a query related to one or more of a type of a roof and a type of damage may be received. For example, a mobile application may be downloaded and installed onto a client device 130. The mobile application may be configured to receive the query related to the roof. For example, one or more data entry fields may be provided for the input of data, and the user may query related to the type of roof and/or the type of damage. The roof may be domestic or commercial.

In some implementations the type of roof may include one or more of shingle, ceramic, membrane, metal, and concrete. Generally speaking, ventilation and insulation are two significant functions of a roof. Also significant is the ability of the roof to withstand weather-related elements such as wind, hail, and water. Accordingly, the type of roof may be selected to perform such functions. For example, the size of a house may determine the weight of a roof that the house may support, and the type of roof may be selected based on the weight requirements. For example, materials such as slate, stone, and tile are heavy, and may be unsuitable for houses that cannot support their weight.

In some implementations the type of damage may include one or more of damage related to hail, wind, ice, water, a nail, a manufacturer's defect, installation defect, and human-induced damage. For example, many parts of the United States are susceptible to hail, and there is an average of 3,000 hailstorms a year. During a hailstorm, descriptors that include the size of hail, the duration of a hailstorm, and wind direction, may be correlated to the type and extent of damage to a roof based on logs of past disaster response and recovery efforts. This assessment may additionally factor in the type of roofing used.

At step 510, the query may be provided to a central server. For example, application 135 may send the query to the roof guide 140. The roof guide 140 may access one or more databases, such as the roof database 115 to search for information related to the query. For example, the user may input "Shingle" and the query may be forwarded to the roof guide 140. The roof guide 140 may search the roof database 115 for information related to the term "Shingle".

At step 520, at least one first roof image responsive to the query may be retrieved. For example, the roof guide 140 may retrieve, from the central server, one or more images of a roof made of different types of shingle from the roof database 115. As another example, the roof guide 140 may retrieve one or more images of the types of roof made of "Shingle". Also, for example, the roof guide 140 may retrieve one or more images of the types of damages to a roof made of "Shingle".

In some implementations the at least one first roof image may include a before-image of the roof. For example, the roof database 115 may be a repository of roof images for one or more commercial and/or residential properties. Such roof images may include one or more of a satellite image, an aerial image, a street view, and a topographic view. In some implementations the aerial image may be based on image data from one or more of a fixed wing aircraft, a rotating wing aircraft, an unmanned aerial vehicle ("UAV") such as a drone, and a balloon (e.g., a weather balloon). In some implementations the image data may include a video. For example, the UAV may provide a video of one or more roofs and such video may be stored in the roof database 115.

At step 530, user input of a second roof image of a portion of the roof may be received via an application on the mobile device of the user. In some implementations the user may be provided with one or more selectable menus to input a second roof image of a portion of the roof. For example, the user may be provided with an option to input the second roof image from an existing repository of images, and/or the user may be prompted to take an image of the roof. In some implementations the user may access stored images of the roof from the client device 130. For example, an insurance adjuster may be inspecting a damaged roof, and may capture one or more images using a camera. Such images may then be accessible from the adjuster's client device 115. For example, the adjuster may forward images from a camera to the client device 115.

In some implementations selection of a camera menu to capture the camera image may be identified, and the mobile camera may be provided to capture the camera image. In some implementations the client device 130 may be configured to include the mobile camera. The mobile camera may have the capability to capture still images, video images, audio, and so forth. A mobile roof guide application on the client device 130 may be configured so as to be compatible with the mobile camera. For example, upon selection of the camera menu, the mobile application may invoke an application for the mobile camera, and interactively provide the user access to the mobile camera via the mobile roof guide application.

In some implementations receiving the user input of the second roof image may include receiving, via the mobile camera, the camera image. For example, the mobile roof guide application may invoke the application for the mobile camera, and the user may capture the camera image via the mobile camera. The camera image may include a still photograph, a video, and/or an image accompanied by an audio. The application for the mobile camera may forward the camera image to the mobile roof guide application, which may in turn identify the camera image as the second roof image.

At step 540, the at least one first roof image and the second roof image may be displayed via the application on the mobile device of the user. For example, the user may be inspecting potential hail damage to a roof made of Asphalt. The user may have selected at least one first roof image based on a query for "Asphalt, Hail". The user may capture a camera image of a portion of the roof. The mobile roof guide application may provide the user with the at least one first roof image and the second roof image. In some implementations the at least one first roof image and the second roof image may be displayed simultaneously on a mobile display. The user may be able to make a side-by-side comparison of the at least one first roof image and the second roof image. For example, the at least one first roof image may be an image of an undamaged asphalt roof. Comparison of the second roof image with the image of the undamaged asphalt roof may indicate the type and/or extent of damage to the roof. Also for example, the at least one first roof image may be a before-image of a roof being inspected. The before-image may indicate existing damage from a prior hail impact, and/or an impact from a golf ball. Comparison of the second roof image with the before-image may indicate the type and/or extent of damage to the roof, given that the roof was partially damaged.

Roof Guide—Server Processes

Figure 6:
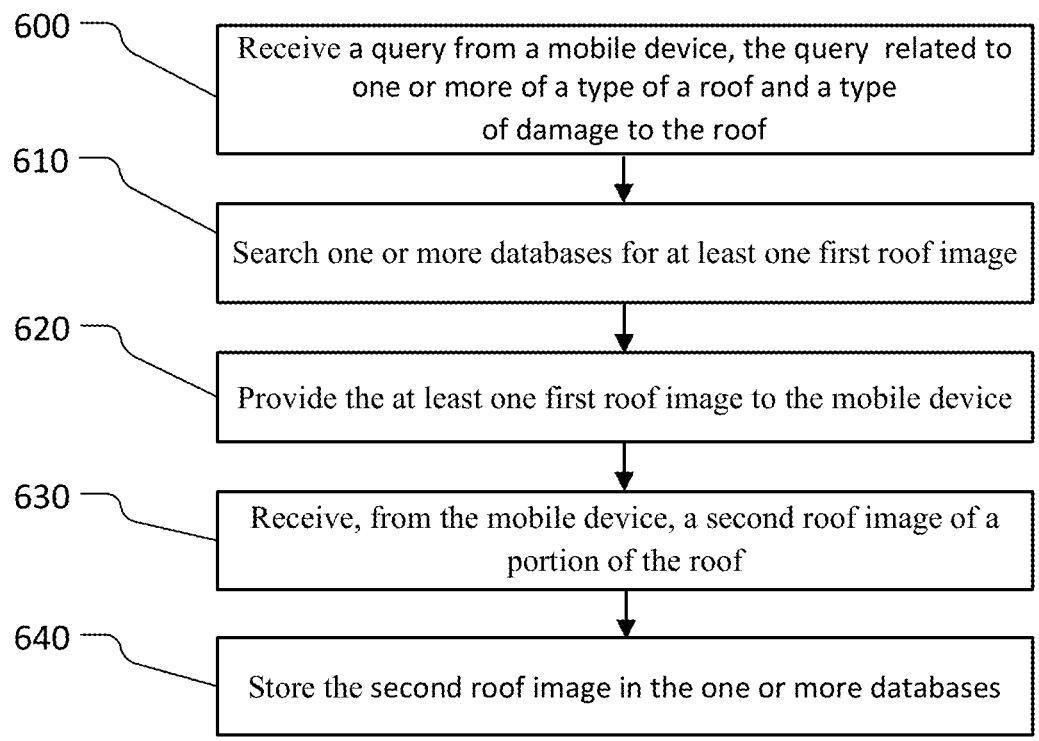
FIG. 6 illustrates a flow diagram of an example process, implemented on a server, for providing a roof guide.

FIG. 6 illustrates a flow diagram of an example process, implemented on a server, for providing a roof guide. For convenience, the method 600-640 will be described with respect to a system that performs at least parts of the method. Other implementations may perform the steps in a different order, omit certain steps, and/or perform different and/or additional steps than those illustrated in FIG. 6. For convenience, aspects of FIG. 6 will be described with reference to a system of one or more computers that perform the process. The system may include, for example, one or more components of FIG. 1.

At step 600, a query related to a roof may be received from a mobile device. The query may be related to one or more of a type of a roof and a type of damage to the roof. For example, a user may enter a query related to a roof made of shingle, and the application 135 may provide the central server, for example the roof guide 140, with the query. In some implementations the application 135 may provide the user with at least one query suggestion, and the user may select a query from the at least one query suggestion. For example, the application 135 may provide the user with at least one query suggestion including "Asphalt", "Tile", and "Modified Bitumen", and the user may select "Tile" as the query from the at least one query suggestion. As another example, the application 135 may provide the user with at least one query suggestion including "Man-made damage", "Vertical racking", and "Crazing", and the user may select "Man-made damage" as the query from the at least one query suggestion.

At step 610, one or more databases may be searched for at least one first roof image. For example, the roof guide 140 may receive a query for a roof made of shingle, and may search one or more databases, such as content database 110, and/or roof database 115, for the at least one first roof image for a roof made of shingle. Also, for example, the roof guide 140 may receive a query for a roof made of asphalt, and may search the roof database 115 for the at least one first roof image for a roof made of asphalt. As another example, the roof guide 140 may receive a query for a type of damage to the roof, such as "Man-made damage", and may search the roof database 115 for the at least one first roof image for a type of damage to the roof, such as "Man-made damage".

At step 620, the at least one first roof image may be provided to the mobile device. For example, the at least one first roof image for a roof made of shingle may be provided by the roof guide 140 to the application 135. Also, for example, the at least one first roof image for a roof made of asphalt may be provided by the roof guide 140 to the application 135. As another example, the at least one first roof image for a type of damage to the roof, such as "Man-made damage" may be provided by the roof guide 140 to the application 135.

At step 630, a second roof image of a portion of the roof may be received from the mobile device. In some implementations the application for the mobile camera may forward a captured camera image to the application 135, which may in turn forward the camera image to the roof guide 140. In some implementations roof guide 140 may provide access to a collection of roof images stored in one or more databases, including images stored on the client device 130. The user may select the second roof image from the collection of roof images.

At step 640, the second roof image may be stored in the one or more databases. For example, the roof guide 140 may forward the second roof image to the roof database 115. As another example, the camera image may be forwarded by the roof guide 140 to the roof database for storage and/or indexing purposes.

In some implementations an input of data may be received from the mobile device, the input of data based on a comparison of the at least one first roof image and the second roof image. For example the input of data may be received by the roof guide 140 via the application 135. In some implementations the input of data may be stored in the roof database. For example the roof guide 140 may forward the input of data to the roof database 115. The input of data may include one or more of a text input, an audio input, an image input, and a video input.

Figure 7:
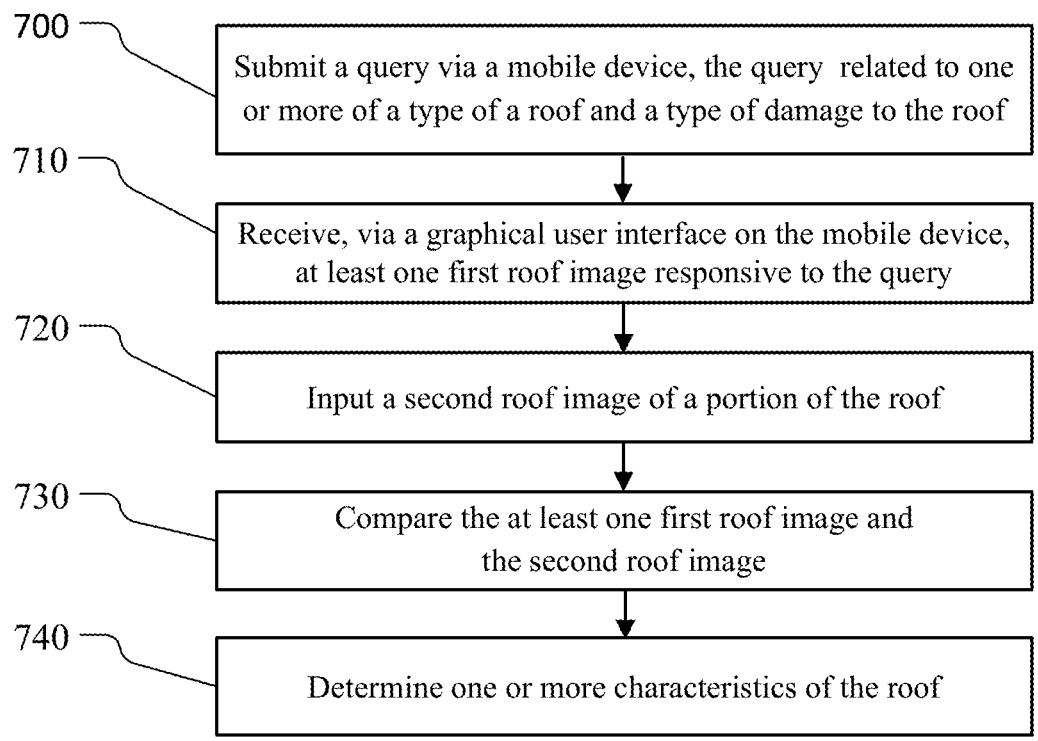
FIG. 7 illustrates a flow diagram of an example process for using a roof guide.

Referring now to FIG. 7, an example process for using a roof guide is illustrated. For convenience, the method 700-740 will be described with respect to a system that performs at least parts of the method. Other implementations may perform the steps in a different order, omit certain steps, and/or perform different and/or additional steps than those illustrated in FIG. 7. For convenience, aspects of FIG. 7 will be described with reference to a system of one or more computers that perform the process. The system may include, for example, one or more components of FIG. 1.

At step 700, a query may be submitted via a mobile device, the query related to one or more of a type of a roof and a type of damage to the roof. For example, one or more data entry fields may be provided for input of data, and the user may enter a query related to the type of the roof and/or the type of damage to the roof. For example, a user may submit a query related to a roof made of shingle, and the application 135 may provide the roof guide 140 with the query. In some implementations the user may receive at least one query suggestion via application 135, and the user may select a query from the at least one query suggestion. For example, the application 135 may provide the user with at least one query suggestion including "Asphalt", "Tile", and "Modified Bitumen", and the user may select "Tile" as the query from the at least one query suggestion. As another example, the application 135 may provide the user with at least one query suggestion including "Man-made damage", "Vertical racking", and "Crazing", and the user may select "Man-made damage" as the query from the at least one query suggestion.

At step 710, at least one first roof image responsive to the query may be received via a graphical user interface on the mobile device. For example, the roof guide 140 may receive a query for a roof made of shingle, and may search one or more databases, such as content database 110, and/or roof database 115, for the at least one first roof image for a roof made of shingle. The user may receive the at least one first roof image for a shingle roof via the graphical user interface on the mobile device. As another example, the roof guide 140 may receive a query for a type of damage to the roof, such as "Man-made damage", and may search the roof database 115 for the at least one first roof image for a type of damage to the roof, such as "Man-made damage". The user may receive the at least one first roof image related to "Man-made damage" via the graphical user interface on the mobile device.

At step 720, a second roof image of a portion of the roof may be inputted. In some implementations inputting the second roof image of the portion of the roof may include capturing a camera image via a mobile camera. For example, the user may invoke, via the roof guide 140, an application for a mobile camera to capture a camera image of the portion of the roof. In some implementations the user may select the second roof image from a collection of roof images stored in one or more databases.

At step 730, the at least one first roof image and the second roof image may be compared. For example, the user may be inspecting a roof to determine the type of roof. The user may compare (e.g., via a side-by-side comparison) the at least one first roof image and the second roof image to determine the type of roof. Also, for example, the user may be inspecting a roof made of asphalt for a type of damage. The user may have selected at least one first roof image based on a query for "Asphalt". The user may capture a camera image of a portion of the roof. The roof guide 140 may provide the user with the at least one first roof image and the second roof image. In some implementations the at least one first roof image and the second roof image may be displayed simultaneously on a mobile display. The user may be able to make a side-by-side comparison of the at least one first roof image and the second roof image. For example, the at least one first roof image may be an image of an asphalt roof with hail damage. The second roof image may be an image of a portion of the roof. The user may compare the at least one first roof image and the second roof image to determine that the type of damage to the asphalt roof is due to hail.

At step 740, one or more characteristics of the roof may be determined. The one or more characteristics may be determined based on the comparing of the at least one first roof image and the second roof image, the one or more characteristics including the type of the roof and the type of damage to the roof. For example, comparison of the second roof image with the image of the undamaged asphalt roof may indicate the type and/or extent of damage to the roof. Also for example, the at least one first roof image may be a before-image of a roof being inspected. The before-image may indicate existing damage from a prior hail impact, and/or an impact from a golf ball. Comparison of the second roof image with the before-image may indicate the type and/or extent of damage to the roof, given that the roof was partially damaged. As another example, comparison of the at least one first roof image and the second roof image may allow the user to determine that the roof is made of asphalt. The determined one or more characteristics of the roof may include notes by the user, the at least one first roof image, the second roof image, an address, a location, product identifiers for one or more roofing components, and so forth.

In some implementations the method may include providing input of data in a data entry field, the input of data including the determined one or more characteristics of the roof. The input of data may include one or more of a text input, an audio input, an image input, and a video input. In some implementations one or more of the input of data, the at least one first roof image, and the second roof image may be shared via an electronic communication system. In some implementations the electronic communication system may include one or more of an electronic mail and a text message.

Figure 8:
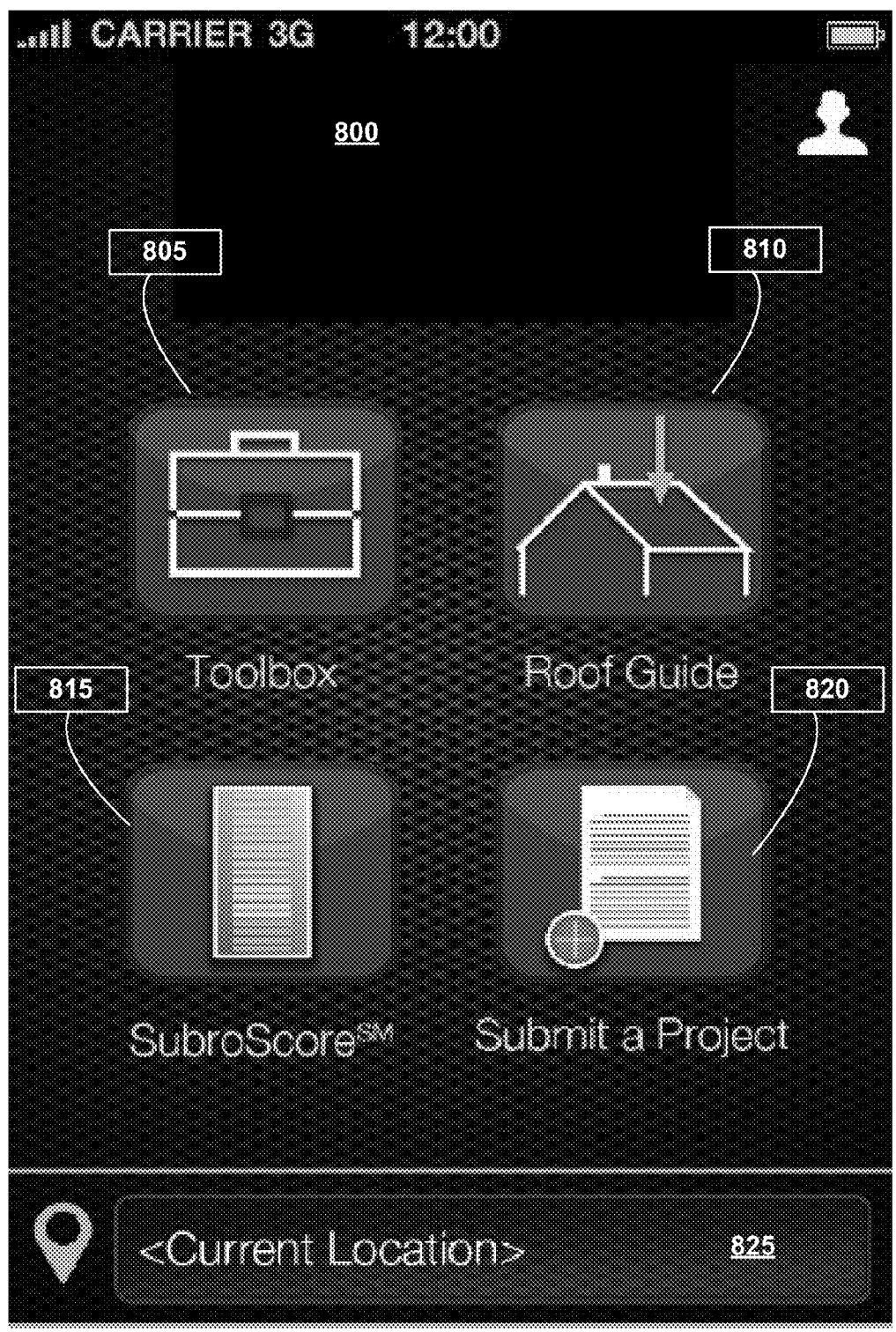
FIG. 8 illustrates an example graphical user interface for providing access to a roof guide.

Referring now to FIG. 8, an example graphical user interface providing access to a roof guide is illustrated. A graphical user interface 800 is illustrated with a first selectable menu for a "Toolbox" 805, a second selectable menu for a "Roof Guide" 810, a third selectable menu for a "SubroScore" 815, and a fourth selectable menu for "Submit a Project" 820. Selection of the second selectable menu for a "Roof Guide" 810 may direct the user to the roof guide as described herein. Selection of the third selectable menu for a "SubroScore" 815 may direct the user to a determination of a subrogation score as described herein. Selection of the fourth selectable menu for "Submit a Project" 820 may direct the user to submission of a subrogation project as described herein. Optionally, a data entry field 825 may be provided for entry of the current location. For example, the address of the property where the roof is located may be entered. The graphical user interface 800 is for illustrative purposes only. Additional and/or alternative menus may be provided. For example, in some implementations, "Roof Guide" 810 may be accessed via a menu for "Guides & Checklists". User selection of "Guides & Checklists" may direct the user to a new graphical user interface that may provide selectable menus for one or more of a "Roof Guide", a "Best Practice Field Guide", and "Checklists". Also, in some implementations, additional and/or alternative tools may be provided via "Toolbox" 805.

Subrogation System and/or Project Reporting Tool

In some implementations one or more product identifiers may be received at the central server, the one or more product identifiers identifying one or more roofing components related to the roof. In some implementations during operation, a subrogation opportunity processing system may identify, via the user-interface on the mobile application 135, one or more product identifiers, the one or more product identifiers identifying one or more roofing components related to the roof, and providing, via the one or more servers, the one or more product identifiers to the central server.

In some implementations the one or more roofing components may include a shingle, tile, underlayment, flashing, skylight, hip, trim tile, hip starter, rake, gable end, eaves, battens, ridge board, rafter, ceiling joist, ridge beam, purlin, plate, brace, top chord, bottom chord, sheathing, and truss. In some implementations the method may include determining a subrogation score for a given roofing component of the one or more roofing components, the subrogation score indicative of a subrogation opportunity relative to the roofing component. In some implementations the method may include providing one or more steps to submit a given roofing component of the one or more roofing components for a project via a project reporting tool. In some implementations an application 115 may prompt the user to enter claim information, including information related to the insured party, the claim number, the date of loss, and so forth.

Example Computer System

Figure 9:
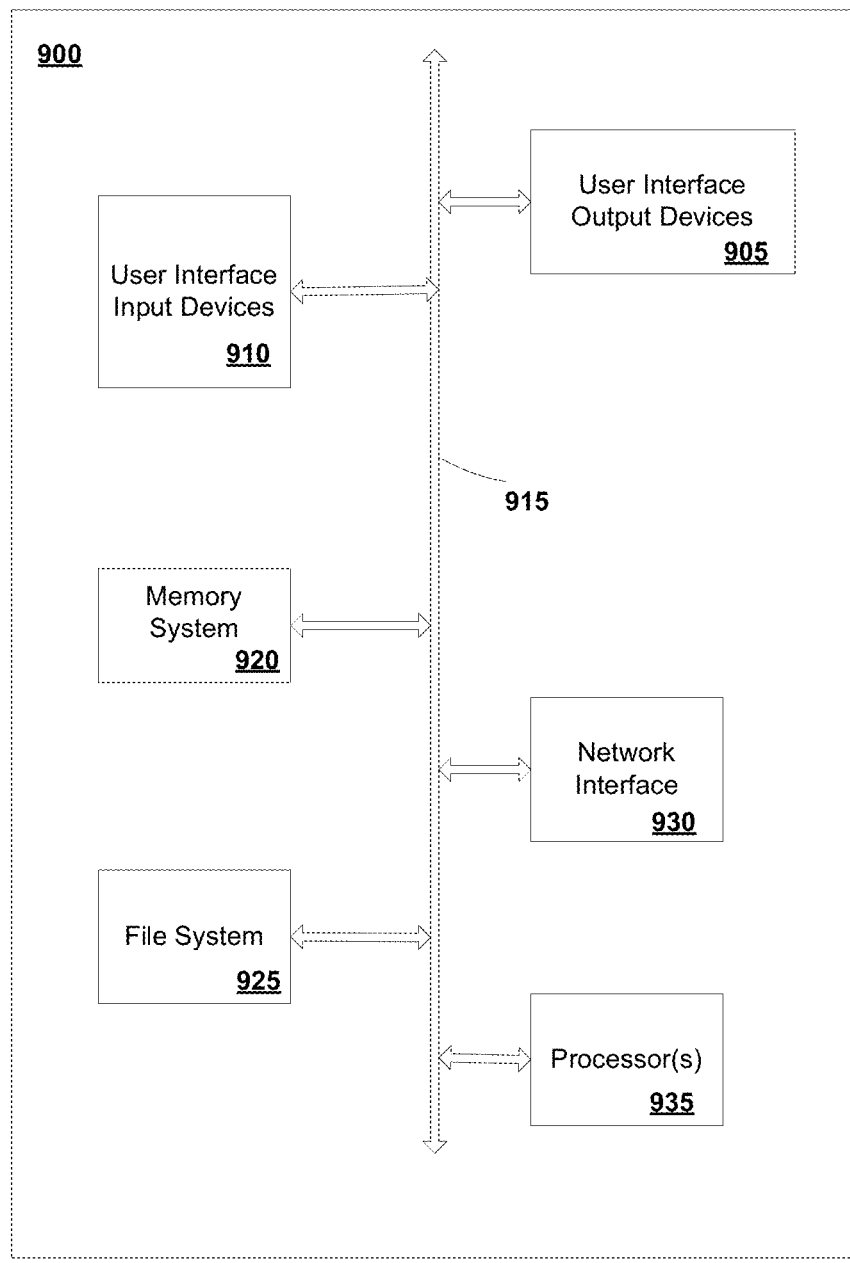
FIG. 9 illustrates a block diagram of an example computer system.

FIG. 9 is a block diagram of an example computer system 900. Computer system 900 may include one or more processors 935 which may communicate with a number of peripheral devices via bus subsystem 915. Peripheral devices may include, for example, a memory system 920 and a file system 925, user interface input devices 910, user interface output devices 905, and a network interface system 930. The input and output devices allow user interaction with computer system 900. Network interface system 930 provides an interface to outside networks and may be coupled to corresponding interface devices in other computer systems.

User interface input devices 910 may include devices such as a keyboard, a mouse, and a touchscreen. User interface input devices 910 may also include audio input devices, and/or other types of input devices including mobile devices such as client devices 130. User interface output devices 905 may include devices such as a display (e.g., on a computing device 160), a printer, and a fax machine. User input devices 910 may also include, for example, a scanning device for digitally scanning a product barcode. Also, for example, user input devices 910 may include a camera for capturing images.

Memory system 920 may include a number of conventional memory systems including a main random access memory (RAM) for storage of instructions and data during program execution and a read only memory (ROM) in which fixed instructions are stored. File system 925 may provide persistent storage for program and data files, and may include a hard disk drive, and/or an optical drive. Other conventional file storage systems may be used. The memory system 920 and the file system 925 may include the logic to respond to a search query. Also, for example, the memory system 920 and the file system 925 may include the logic to implement the processes disclosed in steps 500-540, steps 600-640, and/or 700-740. These software modules are generally executed by processor 935 alone or in combination with other processors.

Bus subsystem 915 provides a mechanism for letting the various components and subsystems of computer system 900 communicate with each other as intended.

Computer system 900 may be of varying types including a workstation, server, or any other data processing system or computing device, including a mobile device. The description of computer system 900 depicted in FIG. 9 is intended only as a specific example for purposes of illustrating some implementations, and represents one of several possible configurations.

While there has been described and illustrated particular implementations of a system and method for providing instantly redeemable tokens based on user activity on a website, it will be apparent to those skilled in the art that variations and modifications may be possible without deviating from the broad spirit and principle of the present invention, which shall be limited solely by the scope of the claims appended hereto.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

It is understood that these examples are intended in an illustrative rather than in a limiting sense. Computer-assisted processing is implicated in the described embodiments. It is contemplated that modifications and combinations will readily occur, which modifications and combinations will be within the scope of the following claims.

The invention claimed is:

1. A method for providing a roof guide, implemented on a mobile device of a user, and comprising:
   providing an application on the mobile device, the application including a first data entry field;
   receiving, via the first data entry field, a search query indicative of selection by the user of one or more of a type of roof and a type of roof damage;
   providing the search query to a central server;
   receiving, from the central server, at least one first roof image responsive to the search query, the at least one first roof image being a reference image depicting one or more of the type of roof and the type of roof damage;
   receiving, via one or more selectable menus of the application on the mobile device of the user, user input of a second roof image of a portion of a roof under inspection; and
   displaying, via the application on the mobile device of the user, the at least one first roof image and the second roof image to perform a roof damage comparison;
   receiving, via a second data entry field of the application on the mobile device of the user, an input of data based on the comparison; and
   providing the input of data to the central server for storing in one or more databases.

2. The method of claim 1, wherein the search query relates to both the type of roof and the type of roof damage, and the at least one first roof image depicts both the type of roof and the type of roof damage.

3. The method of claim 1, wherein receiving the search query includes:
   providing the user with at least one query suggestion; and
   identifying user selection of the search query from the at least one query suggestion.

4. The method of claim 1, wherein the input of data includes one or more of a text input, an audio input, an image input, and a video input.

5. The method of claim 1, wherein at least one database of the one or more databases is external to the mobile device.

6. The method of claim 1, further including providing one or more of the input of data, the at least one first roof image, and the second roof image to the user.

7. The method of claim 6, wherein providing the input of data includes providing the input of data via one or more of an electronic mail and a text message.

8. The method of claim 1, wherein the one or more selectable menus to input the second roof image includes a camera menu to capture a camera image of the roof, and further including:
   identifying selection of the camera menu to capture the camera image; and
   providing, via the application on the mobile device of the user, a mobile camera to capture the camera image.

9. The method of claim 8, wherein identifying the user input of the second roof image includes receiving, via the mobile camera, the camera image.

10. The method of claim 1, wherein the at least one first roof image includes a before-image of the roof.

11. The method of claim 1, wherein one or more of the at least one first roof image and the second roof image includes image data from an aerial vehicle.

12. The method of claim 11, wherein the aerial vehicle is one or more of a fixed wing aircraft, a rotating wing aircraft, an unmanned aerial vehicle, and a balloon.

13. The method of claim 1, wherein the type of roof includes one or more of shingle, ceramic, membrane, metal, and concrete.

14. The method of claim 13, wherein the shingle type of roof includes one or more of wood, slate, asphalt, synthetic rubber, and stone.

15. The method of claim 13, wherein the membrane type of roof includes one or more of thermoset membrane, thermoplastic sheets, and synthetic polymer.

16. The method of claim 13, wherein the metal type of roof includes one or more of galvanized steel, copper, and stone coated metal.

17. The method of claim 1, further comprising:
   identifying, via a user interface of the application, one or more product identifiers, the one or more product identifiers identifying one or more roofing components related to the roof; and
   providing the one or more product identifiers to the central server.

18. The method of claim 17, wherein the one or more roofing components include a shingle, tile, underlayment, flashing, skylight, hip, trim tile, hip starter, rake, gable end, eaves, battens, ridge board, rafter, ceiling joist, ridge beam, purlin, plate, brace, top chord, bottom chord, sheathing, and truss.

19. A computer implemented method for providing a roof guide, comprising:
   receiving, at a central server, a search query from a mobile device, the search query indicative of user selection of one or more of a type of roof and a type of roof damage;
   searching, based on the search query, one or more databases for at least one first roof image responsive to the search query, the at least one first roof image being a reference image depicting one or more of the type of roof and the type of roof damage;
   providing the at least one first roof image to the mobile device;

receiving, at the central server, a second roof image of a portion of a roof under inspection from the mobile device;

storing the second roof image in the one or more databases;

receiving, at the central server, an input of data from the mobile device, the input of data based on a roof damage comparison of the at least one first roof image and the second roof image; and storing the input of data in the one or more databases.

20. The method of claim 19, wherein the input of data includes one or more of a text input, an audio input, an image input, and a video input.

21. The method of claim 19, wherein receiving the second roof image includes receiving a camera image, the camera image captured via a mobile camera of the mobile device.

22. The method of claim 19, wherein the at least one first roof image includes a before-image of the roof.

23. The method of claim 19, wherein one or more of the at least one first roof image and the second roof image includes image data from an aerial vehicle.

24. The method of claim 23, wherein the aerial vehicle is one or more of a fixed wing aircraft, a rotating wing aircraft, an unmanned aerial vehicle, and a balloon.

25. A method of using a roof guide, the method comprising:

submitting a search query via a mobile device, the search query indicative of selection by a user of one or more of a type of roof and a type of roof damage;

receiving from one or more databases, via a graphical user interface on the mobile device, at least one first roof image responsive to the search query, the at least one first roof image being a reference image depicting one or more of the type of roof and the type of roof damage;

inputting, via one or more selectable menus of the graphical user interface on the mobile device, a second roof image of a portion of a roof under inspection;

performing a roof damage comparison using the at least one first roof image and the second roof image; and determining one or more characteristics of the roof under inspection based on the comparison of the at least one first roof image and the second roof image, the one or more characteristics including the type of roof and the type of roof damage.

26. The method of claim 25, wherein submitting the search query via the mobile device includes entering the search query in a first data entry field.

27. The method of claim 25, wherein submitting the search query via the mobile device includes:

receiving, via the graphical user interface on the mobile device, at least one query suggestion; and selecting the search query from the at least one query suggestion.

28. The method of claim 25, wherein inputting the second roof image of the portion of the roof includes capturing a camera image via a mobile camera.

29. The method of claim 25, wherein inputting the second roof image of the portion of the roof includes selecting the second roof image from a collection of roof images stored in the one or more databases.

30. A mobile device including memory, a communication interface, and one or more processors operable to execute instructions stored in the memory, comprising instructions to:

receive, via a data entry field of an application operating on the mobile device, a search query indicative of selection by a user of one or more of a type of roof and a type of roof damage;

provide the search query to a central server via the communication interface;

receive, from the central server via the communication interface, at least one first roof image responsive to the search query, the at least one first roof image being a reference image depicting one or more of the type of roof and the type of roof damage;

receive, via one or more selectable menus of the application on the mobile device of the user, user input of a second roof image of a portion of a roof under inspection; and simultaneously display, via the application on the mobile device of the user, the at least one first roof image and the second roof image for the user to perform roof damage comparison.

31. The mobile device of claim 30, wherein the instructions further include instructions to provide a camera menu to capture a camera image of the roof, and further include instructions to:

identify selection of the camera menu to capture the camera image; and provide, via the application on the mobile device of the user, a mobile camera to capture the camera image.

32. The mobile device of claim 31, wherein the instructions further include instructions to receive, via the mobile camera, the camera image.

33. A system including memory and one or more processors operable to execute instructions stored in the memory, comprising instructions to:

receive, at a central server, a search query from a mobile device, the search query indicative of user selection at the mobile device of one or more of a type of roof and a type of roof damage;

search, based on the search query, one or more databases for at least one first roof image responsive to the search query, the at least one first roof image being a reference image depicting one or more of the type of roof and the type of roof damage;

provide the at least one first roof image to the mobile device;

receive, at the central server, a second roof image of a portion of roof under inspection from the mobile device;

store the second roof image in the one or more databases;

receive an input of data from the mobile device, the input of data based on a roof damage comparison of the at least one first roof image and the second roof image; and store the input of data in the one or more databases.

* * * * *